United States Patent
Forouhar

(10) Patent No.: US 8,914,986 B1
(45) Date of Patent: Dec. 23, 2014

(54) INCLINOMETER DEVICE AND METHOD OF MANUFACTURE

(71) Applicant: The Boeing Company, Seal Beach, CA (US)

(72) Inventor: Farshad Forouhar, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 13/742,715

(22) Filed: Jan. 16, 2013

(51) Int. Cl.
G01C 9/02 (2006.01)
G01C 9/04 (2006.01)
G01C 25/00 (2006.01)

(52) U.S. Cl.
CPC . *G01C 9/04* (2013.01); *G01C 25/00* (2013.01)
USPC .......................................... 33/365; 33/366.11

(58) Field of Classification Search
USPC ................................................ 33/365, 366.11
See application file for complete search history.

(56) References Cited

U.S. PATENT DOCUMENTS 7,389,591 B2 * 6/2008 Jaiswal et al. ............. 33/366.11
8,015,718 B2 * 9/2011 Jaiswal et al. ............. 33/366.11
2006/0021240 A1 * 2/2006 Horgan ...................... 33/366.11
2007/0245578 A1 * 10/2007 Clark et al. ..................... 33/365
2012/0227274 A1 * 9/2012 Watanabe et al. ............... 33/365
2014/0237833 A1 * 8/2014 Schubert et al. ................ 33/365

OTHER PUBLICATIONS

BeanAir, BeanDevice Smart Sensor, www.beanair.com, pp. 49-52.
Baronti, et al., Multi-sensor multi-protocol acquisition system for luxury-yacht production test and characterization, International Conference on Signals, Circuits and Systems, dated 2009, pp. 6.
CCM Technologies, Wireless Inclinometer, date retrieved Oct. 1, 2012, pp. 2.
Digital-Communication Technology Upgrades, Wireless Inclinometer Calibration System, dated 2006-2007, pp. 114-115.
Wenjun, et al., The Mechanical Wireless Inclinometer and Its Applications, Tsinghua Tongfang Knowledge Network Technology Co., Ltd., retrieved on Oct. 1, 2012, pp. 3.
Yu, et al., Wireless inclinometer acquisition system for reducing swing movement control module experiment of hook model, Sensors and Smart Structures Technologies for Civil, Mechanical, and Aerospace Systems, dated 2008, pp. 2.

* cited by examiner

*Primary Examiner* — G. Bradley Bennett
(74) *Attorney, Agent, or Firm* — Armstrong Teasdale LLP

(57) ABSTRACT

Inclinometer devices and methods of manufacturing the same are provided herein. The inclinometer device includes an inclinometer for measuring attitude data of an object, a wireless communication interface for communicating the object attitude data, and a casing. The casing is configured to house the inclinometer and the wireless communication device, and is further configured for use in hazardous environments.

24 Claims, 6 Drawing Sheets

INCLINOMETER DEVICE AND METHOD OF MANUFACTURE

BACKGROUND

The present disclosure relates generally to measuring attitude of manufactured objects, and more particularly to inclinometer devices and methods of manufacturing inclinometer devices.

Large vehicles, and/or structures (hereinafter "objects") are commonly checked to make sure they are level or balanced during the manufacturing process. Keeping an object level to the ground in certain circumstances facilitates ensuring safe and proper operation of the object. To measure whether an object is level, at least some known systems include measuring a pitch and a roll of the object using devices such as plum bobs, spirit levels, and or digital levels. For example, in an aircraft, the leveling process typically involves a mechanic installing a plum bob high up in a wheel well of the aircraft. Inclement weather and wind conditions can cause such installation to be a challenge.

Moreover, devices such as the plum bob require human interpretation, and therefore, the accuracy of such measurement is subject to the experience and skill of the operator. Alternatively, digital levels and other such computerized devices typically include wired connections for power and/or data transmittal. Using such wired connections on a metal object, such as an aircraft, can be difficult. Wireless leveling devices have been manufactured; however, such wireless devices are a challenge to accuracy in connection with the pitch and roll of an object. Moreover, such wireless devices are not necessarily packaged for operation in environments, such as an aircraft.

BRIEF DESCRIPTION

In one aspect, an inclinometer device is provided. The inclinometer device includes an inclinometer for measuring attitude data of an object, a wireless communication interface for communicating the object attitude data, and a casing. The casing is configured to house the inclinometer and the wireless communication device, and is further configured for use in hazardous environments.

In another aspect, a method of manufacturing an inclinometer device is provided. The method includes providing an inclinometer configured to measure attitude data of an object and providing a wireless communication interface for communicating the object attitude data. The method further includes housing the inclinometer and the wireless communication interface in a casing configured for use in hazardous environments.

In another aspect, an attitude measurement system is provided. The system includes an inclinometer device and an inclinometer measurement computer system communicatively coupled to the inclinometer device. The inclinometer device includes an inclinometer for measuring attitude data of an object, a wireless communication interface for communicating the object attitude data, and a casing. The casing is configured to house the inclinometer and the wireless communication device, and is further configured for use in hazardous environments. The inclinometer measurement computer system includes a processor coupled to a memory, the memory including computer-executable instructions that, when executed by the processor, cause the inclinometer measurement computer system to receive the object attitude data from the inclinometer device and display the object attitude data to a user.

In yet another aspect, a method is provided for manufacturing an object using an inclinometer device configured for use in hazardous environments. The method includes installing the inclinometer device to a mainframe of the object, measuring attitude data of the object using an inclinometer, communicating the attitude data to a user using a wireless communication interface, and leveling the object until the inclinometer device indicates that the object is level. The inclinometer and the wireless communication interface are housed within the inclinometer device by a casing.

DRAWINGS

DETAILED DESCRIPTION

Figure 1:
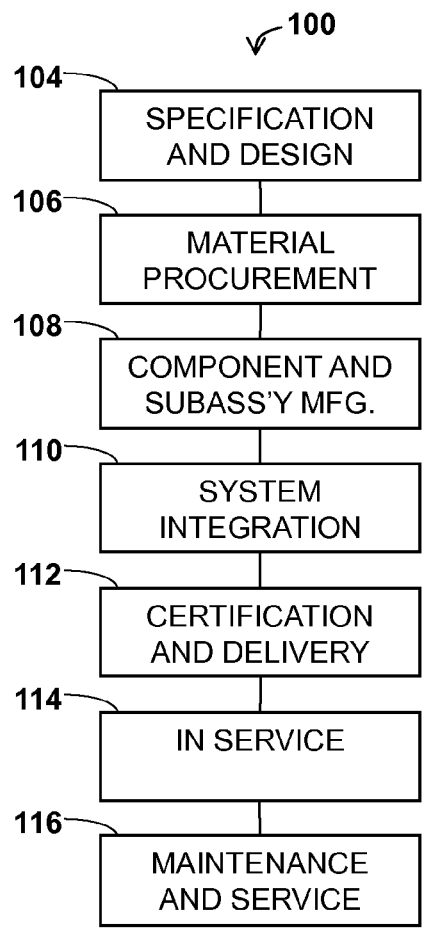
FIG. 1 is a flow diagram of aircraft production and service methodology.
Figure 2:
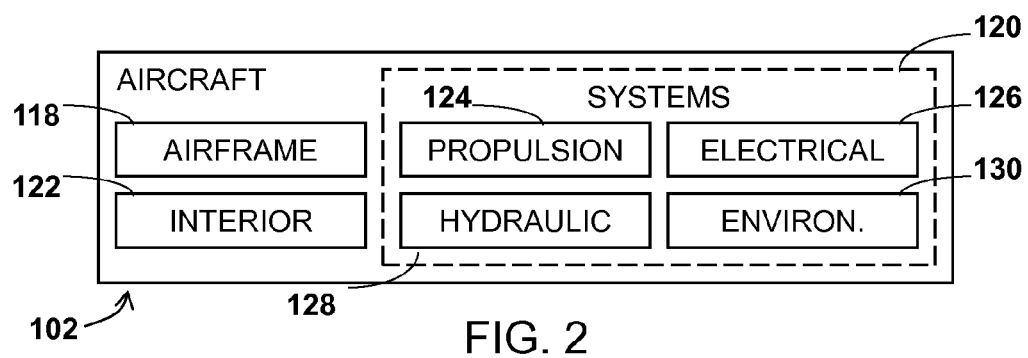
FIG. 2 is a block diagram of an aircraft.

Referring more particularly to the drawings, implementations of the disclosure may be described in the context of an aircraft manufacturing and service method 100 as shown in FIG. 1 and an aircraft 102 as shown in FIG. 2. During preproduction, exemplary method 100 may include specification and design 104 of aircraft 102 and material procurement 106. During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization.

As shown in FIG. 2, aircraft 102 produced by exemplary method 100 may include an airframe 118, a plurality of systems 120, and an interior 122. Examples of high-level systems 120 include one or more of a propulsion system 124, an electrical system 126, a hydraulic system 128, and an environmental system 130. Any number of other systems may be included. Although an aerospace example is shown, the devices and methods described herein may be applied to other industries, such as the automotive industry.

Devices and methods described herein may be employed during any one or more of the stages of the production and service method 100. For example, components or subassemblies corresponding to production process 108 may be fabricated or manufactured in a manner similar to components or subassemblies produced while aircraft 102 is in service. Also, one or more device implementations, method implementations, or a combination thereof may be utilized during the production stages 108 and 110, for example, to facilitate expediting assembly of or reducing the cost of aircraft 102. Similarly, one or more of device implementations, method implementations, or a combination thereof may be utilized while aircraft 102 is in service, for example and without limitation, to maintenance and service 116.

Figure 3:
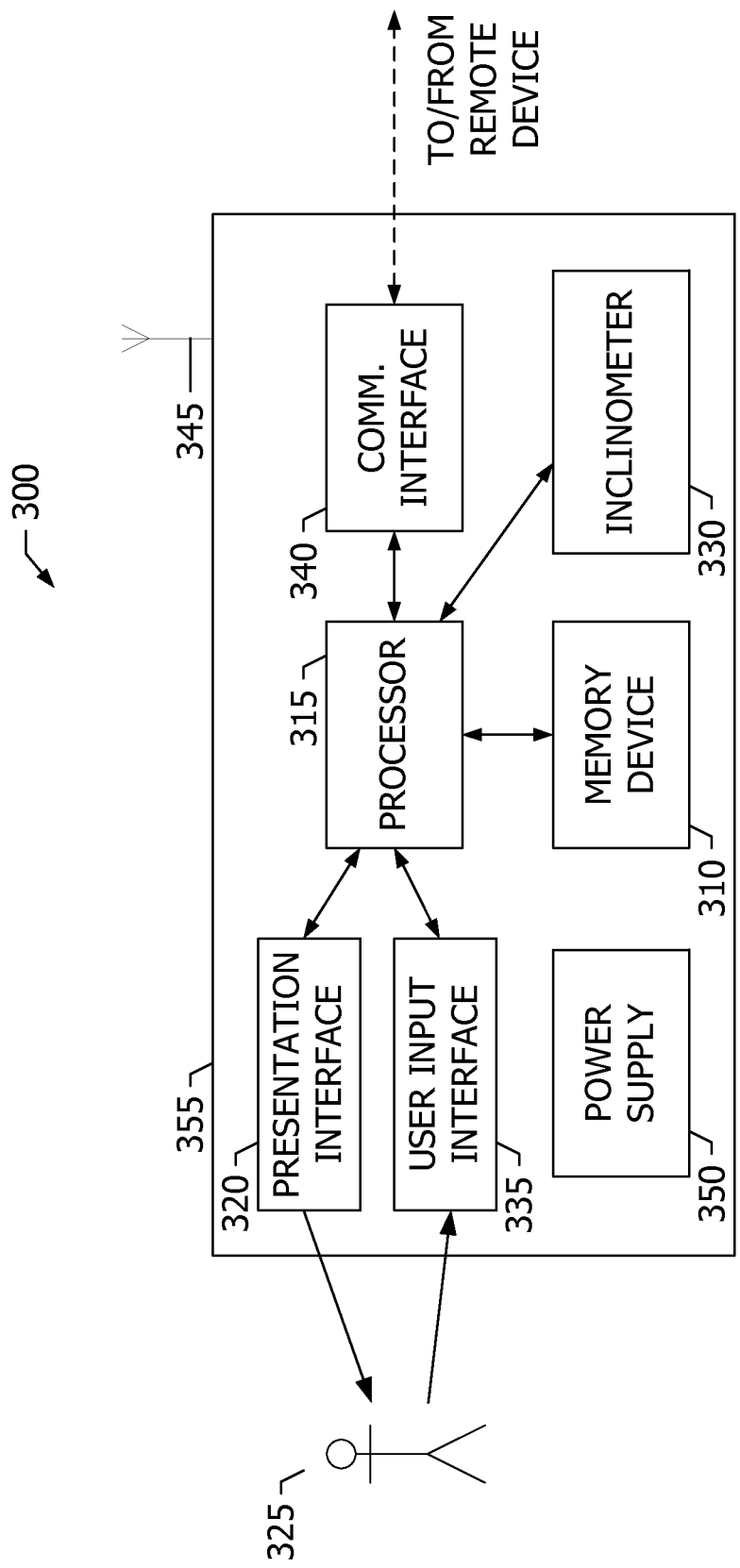
FIG. 3 is a block diagram of an exemplary inclinometer device that may be used with the aircraft shown in FIG. 2.

FIG. 3 is a block diagram of an exemplary inclinometer device 300 that may be used with aircraft 102 (shown in FIG. 2) to measure attitude of aircraft 102. While described herein as being used in an aircraft, the inclinometer device described herein may be used with any object to be leveled, including, but not limited to, a ship, an automobile, a train, a building, an oil platform, and a bridge. Inclinometer device 300 includes at least one memory device 310 and a processor 315 that is coupled to memory device 310 for executing instructions. In some implementations, executable instructions are stored in memory device 310. In the exemplary implementation, processor 315 performs one or more operations described herein by executing one or more executable instructions encoded as operations and stored in memory device 310.

In the exemplary implementation, processor 315 includes one or more processing units (e.g., in a multi-core configuration). Further, in the exemplary implementation, processor 315 is implemented using one or more heterogeneous processor systems in which a main processor is present with secondary processors on a single chip. As another illustrative example, processor 315 may be a symmetric multi-processor system containing multiple processors of the same type. Additionally or alternatively, processor 315 is implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, processor 315 determines the attitude of aircraft 102, as described herein. That is, processor 315 determines pitch and roll of aircraft 102 based on measurements taken from inclinometer 330. Inclinometer 330 may be any known inclinometer capable of determining pitch and roll of an object. In the exemplary implementation, inclinometer device 300 determines aircraft orientation data with an accuracy of 0.01 degrees, exceeding the 0.05 degree accuracy typically used by aircraft leveling standards.

In the exemplary implementation, memory device 310 is one or more devices that enable information such as executable instructions and/or other data to be stored and retrieved. Memory device 310 includes one or more computer readable media, such as, without limitation, dynamic random access memory (DRAM), static random access memory (SRAM), a solid state disk, and/or a hard disk. Additionally or alternatively, memory device 310 is configured to store, without limitation, application source code, application object code, source code portions of interest, object code portions of interest, configuration data, execution events and/or any other type of data.

In some implementations, inclinometer device 300 includes a presentation interface 320 that is coupled to processor 315. Presentation interface 320 presents information, such as application source code and/or execution events, to a user 325. For example, presentation interface 320 may include a display adapter (not shown) coupled to a display device, such as a cathode ray tube (CRT), a liquid crystal display (LCD), an organic LED (OLED) display, and/or an "electronic ink" display. In some implementations, presentation interface 320 includes one or more display devices. In the exemplary implementation, presentation interface 320 displays the attitude of aircraft 102. The attitude is displayed on presentation interface 320 as a pair of coordinates, as an orientation relative to a reference point (i.e., relative to earth horizon), and/or in any format that enables user 325 to observe the attitude of aircraft 102.

In the exemplary implementation, inclinometer device 300 includes a user input interface 335. In the exemplary implementation, user input interface 335 is coupled to processor 315 and receives input from user 325. User input interface 335 includes, for example, without limitation, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

In the exemplary implementation, inclinometer device 300 includes a communication interface 340 coupled to processor 315. Communication interface 340 communicates with one or more remote devices, such as an inclinometer measurement system (shown in FIG. 4). To communicate with remote devices, communication interface 340 includes, for example, a wired network adapter, a wireless network adapter, and/or a mobile telecommunications adapter. In the exemplary implementation, communication interface 340 is a transmitter or a radio frequency (RF) transceiver that wirelessly communicates with a remote device. In an alternative implementation, because signals sometimes have difficulty penetrating aircraft metal, communication interface 340 may be coupled to an antenna 345 to improve strength of the signal sent to the remote device. Antenna 345 is coupled to the inside or the outside of inclinometer device 300, depending on the capabilities of communication interface 340. In the exemplary implementation, inclinometer device 300 has a range of about 200 feet for signal transmission.

In the exemplary implementation, inclinometer device 300 also includes a power supply 350. In the exemplary implementation, power supply 350 includes one or more batteries. Being powered by batteries facilitates increasing mobility and ease of operation of inclinometer device 300 by having no external power cable. Power supply 350 is located at an easily accessible location on inclinometer device 300 such that the batteries may be changed easily and efficiently. In an alternative implementation, power supply 350 may be a rechargeable battery configured to connect to a power cable.

In the exemplary implementation, inclinometer device 300 includes a housing 355 that protects the internal components of inclinometer device 300. Housing 355 is fabricated from a material that complies with National Electrical Code (NEC) standards for operation in Class I, Division I hazardous locations. More specifically, housing 355 is configured to prevent at least one of entry of a flammable gas and exit of an electrical discharge or spark. For example, housing 355 may be fabricated from materials including, but not limited to: Copper-free Aluminum, lens-covered tempered soda lime glass, and an electrostatically applied gray powder epoxy/polyester.

Figure 4:
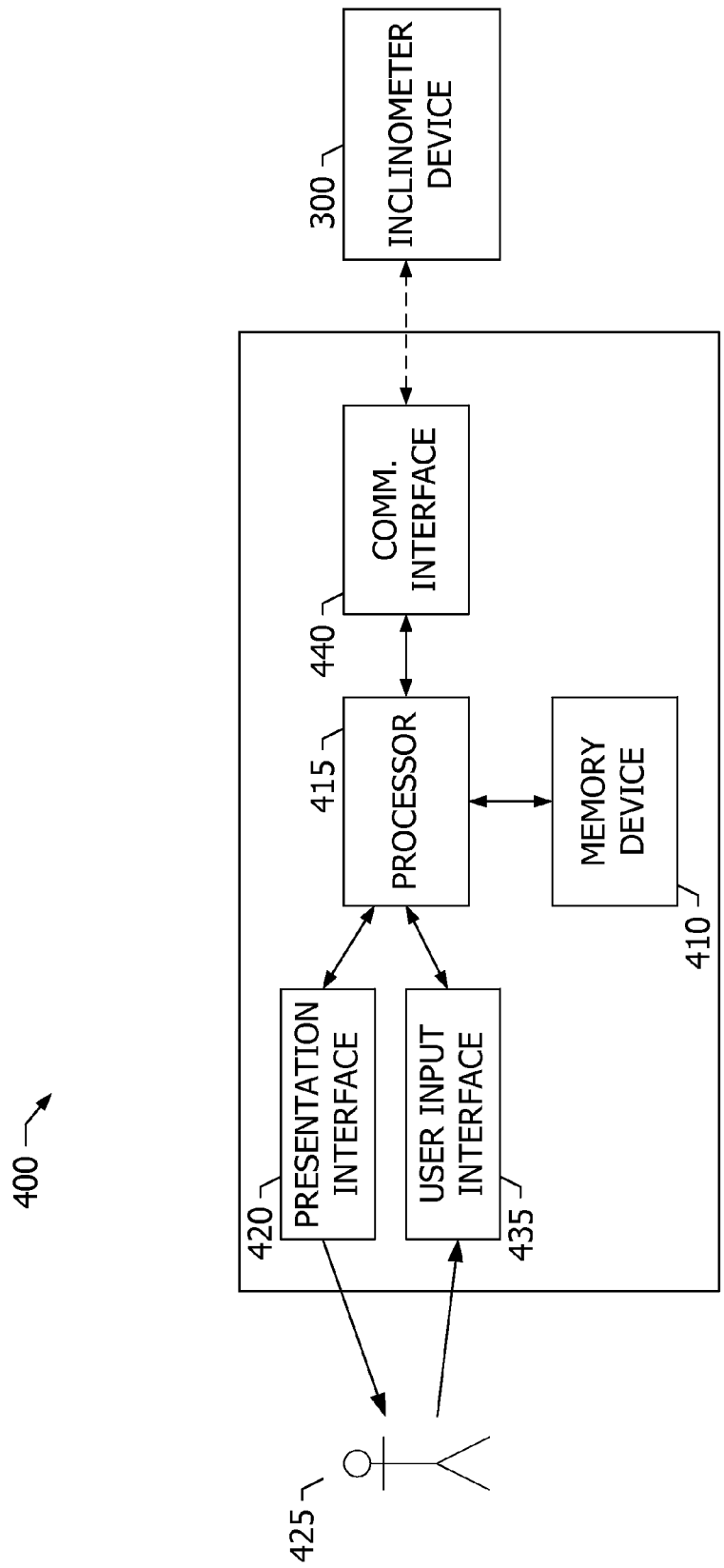
FIG. 4 is a block diagram of an exemplary inclinometer measurement system that may be used with the aircraft shown in FIG. 2.

FIG. 4 is a block diagram of an exemplary inclinometer measurement system 400 that may be used with aircraft 102 (shown in FIG. 2) to measure and display attitude of aircraft 102. System 400 includes at least one memory device 410 and a processor 415 that is coupled to memory device 410 for executing instructions. In some implementations, executable instructions are stored in memory device 410. In the exemplary implementation, processor 415 performs one or more operations described herein by executing one or more executable instructions encoded as operations and stored in memory device 410.

Processor 415 includes one or more processing units (e.g., in a multi-core configuration). Further, in the exemplary implementation, processor 415 is implemented using one or more heterogeneous processor systems in which a main processor is present with secondary processors on a single chip. As another illustrative example, processor 415 may be a symmetric multi-processor system containing multiple processors of the same type. Additionally or alternatively, processor 415 is implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, processor 415 receives and determines the attitude data of aircraft 102, as described herein. That is, processor 415 determines and causes the attitude data of aircraft 102 to be displayed on presentation interface 420, wherein the attitude data is based on measurements transmitted by inclinometer device 300.

In the exemplary implementation, memory device 410 is one or more devices that enable information such as executable instructions and/or other data to be stored and retrieved. Memory device 410 includes one or more computer readable media, such as, without limitation, dynamic random access memory (DRAM), static random access memory (SRAM), a solid state disk, and/or a hard disk. Additionally or alternatively, memory device 410 is configured to store, without limitation, application source code, application object code, source code portions of interest, object code portions of interest, configuration data, execution events and/or any other type of data.

In some implementations, system 400 includes a presentation interface 420 that is coupled to processor 415. Presentation interface 420 presents information, such as application source code and/or execution events, to a user 425. For example, presentation interface 420 may include a display adapter (not shown) that may be coupled to a display device, such as a cathode ray tube (CRT), a liquid crystal display (LCD), an organic LED (OLED) display, and/or an "electronic ink" display. In some implementations, presentation interface 420 includes one or more display devices. In the exemplary implementation, presentation interface 420 displays the attitude of aircraft 102. The attitude may be displayed on presentation interface 420 as a pair of coordinates, as an orientation relative to a reference point (i.e., relative to earth horizon), and/or in any format that enables user 425 to observe the attitude of aircraft 102.

In the exemplary implementation, system 400 includes a user input interface 435. In the exemplary implementation, user input interface 435 is coupled to processor 415 and receives input from user 425. User input interface 435 includes, for example, without limitation, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 420 and user input interface 435.

In the exemplary implementation, system 400 includes a communication interface 440 coupled to processor 415. Communication interface 440 communicates with one or more remote devices, such as inclinometer device 300 (shown in FIG. 3). To communicate with remote devices, communication interface 440 includes, for example, a wired network adapter, a wireless network adapter, and/or a mobile telecommunications adapter. In the exemplary implementation, communication interface 440 is a dongle that is coupled to a universal serial bus (USB) port of system 400.

System 400 enables user 425 (i.e., supervisor 425) to monitor attitude of aircraft 102 from a remote location, while user 325 (i.e., mechanic 325) simultaneously uses inclinometer device 300 on-location to determine and monitor attitude on aircraft 102.

Figure 5:
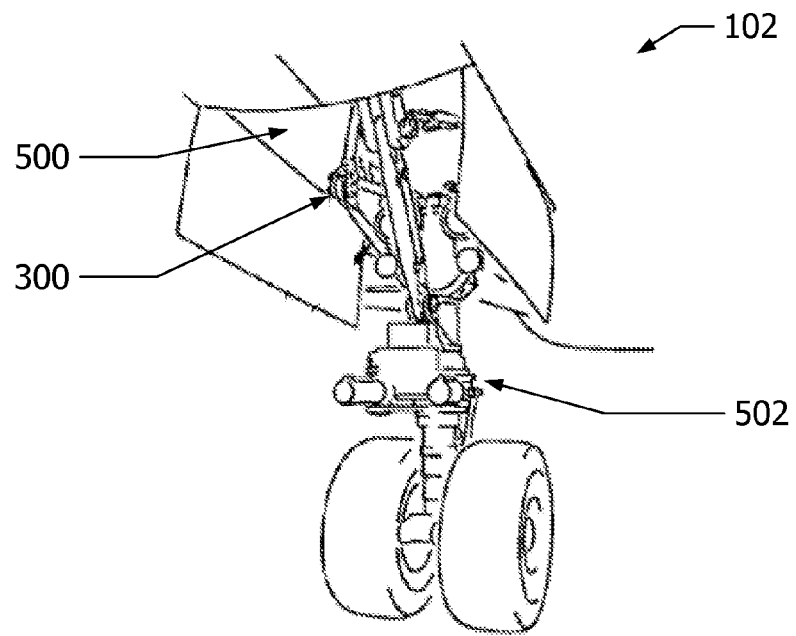
FIG. 5 is a perspective view of the inclinometer device shown in FIG. 3 installed in an aircraft.
Figure 6:
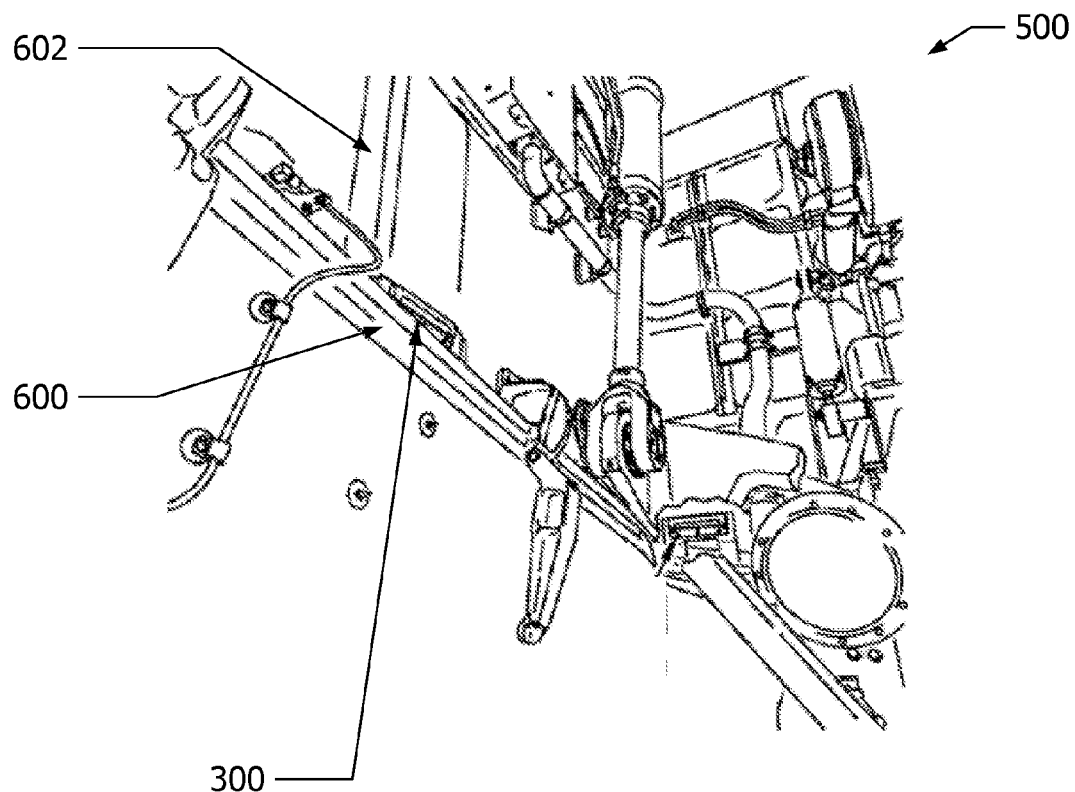
FIG. 6 is an enlarged perspective view of the inclinometer device shown in FIG. 3 installed in an aircraft.

FIG. 5 is a perspective view of the inclinometer device 300 (shown in FIG. 3) installed in aircraft 102 (shown in FIG. 1). FIG. 6 is an enlarged perspective view of the inclinometer device 300 installed in aircraft 102. In the exemplary implementation, aircraft 102 includes a right rear wheel well 500 that houses landing gear 502. Within wheel well 500, aircraft 102 includes a mainframe 600 and at least one support structure 602 coupled to mainframe 600. As used herein, a mainframe is used as a reference point to which all other parts of aircraft 102 are leveled.

Figure 7:
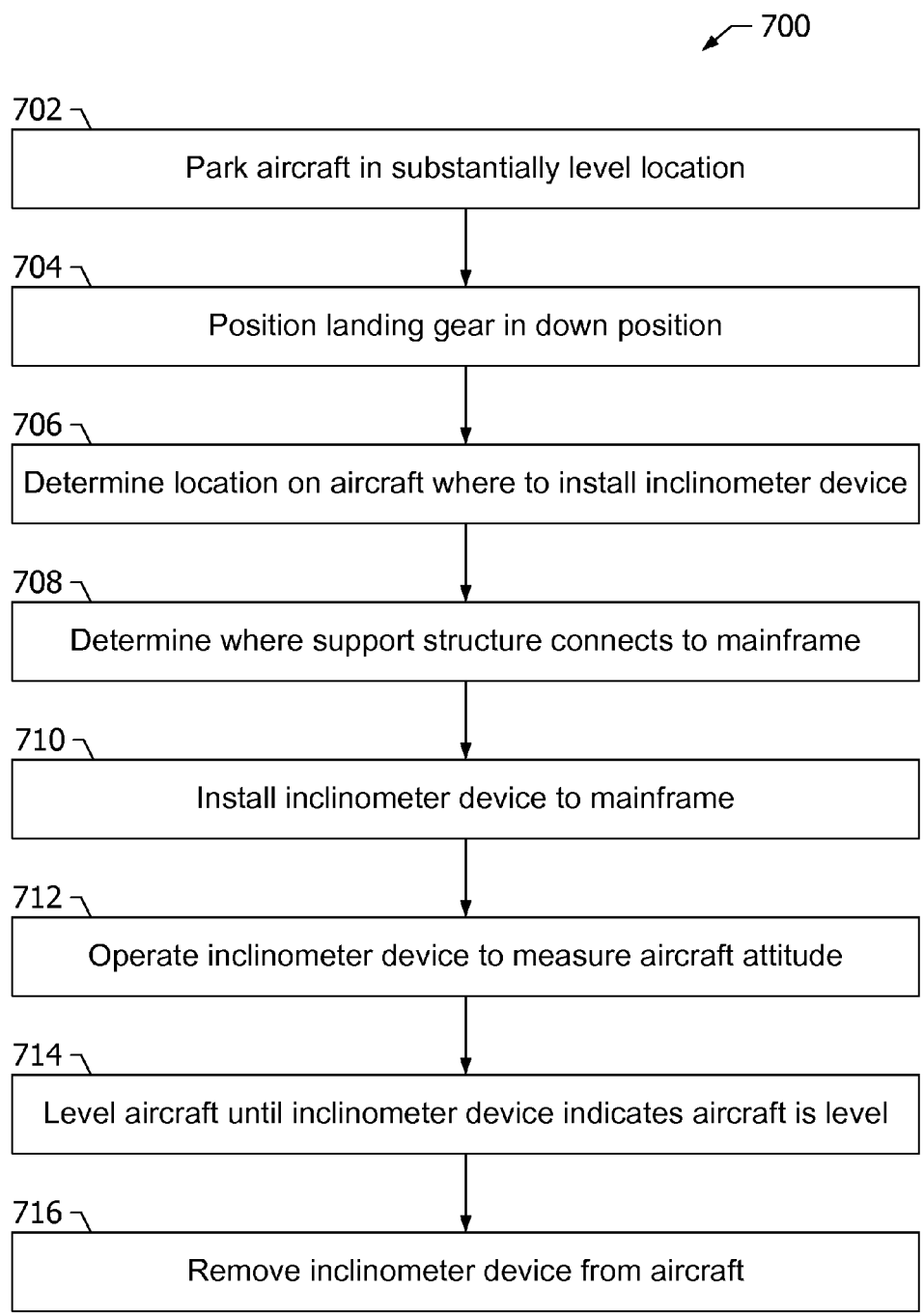
FIG. 7 is a flow chart of a method of manufacturing an object using the inclinometer device shown in FIG. 3.

FIG. 7 is a flow chart of a method 700 of manufacturing an object, such as aircraft 102 (shown in FIGS. 5 and 6) using inclinometer device 300 (shown in FIG. 3). In the exemplary implementation, a user, such as user 325 (shown in FIG. 3) parks 702 aircraft 102 in a substantially level location and positions 704 landing gear 502 (shown in FIG. 5) in a down position. In the exemplary implementation, user 325 determines 706 a location on aircraft 102 where to install inclinometer device 300. While in the exemplary implementation inclinometer device 300 is installed in wheel well 500, the leveling process may include installing inclinometer device 300 in other locations, including, but not limited to, a nose wheel well and/or the left rear wheel well. Within wheel well 500, in the exemplary implementation, user 325 determines 708 where support structure 602 connects to mainframe 600. User 325 installs 710 or connects inclinometer device 300 to mainframe 600 such that inclinometer device 300 uses mainframe 600 as a leveling reference, or baseline.

Upon installation, user 325 operates 712 inclinometer device 300 using user input interface 335 (shown in FIG. 3). Inclinometer sensors 330 (shown in FIG. 3) measure tilt and pitch of aircraft 102 and transmit aircraft orientation data to processor 315 (shown in FIG. 3). In one implementation, inclinometer device 300 displays the aircraft orientation data to user 325 via presentation interface 320 (shown in FIG. 3). Alternatively, inclinometer device 300 wirelessly transmits the aircraft orientation data to a remote device, such as inclinometer measurement system 400 (shown in FIG. 4) via communication interface 340 (shown in FIG. 3). System 400 receives the aircraft orientation data via communication interface 440 (shown in FIG. 4). Processor 415 (shown in FIG. 4) processes and displays the data to remote user 425 (shown in FIG. 4) via presentation interface 420 (shown in FIG. 4). Additionally or alternatively, the data may be stored within memory device 410 (shown in FIG. 4) of system 400.

Based on the orientation data, user 325 uses a jack to lift 714 portions of aircraft 102 until inclinometer device 300 indicates aircraft 102 is level. Upon completion of attitude analysis by user 325 and/or user 425, user 325 removes 716 inclinometer device 300 from aircraft 102.

Figure 8:
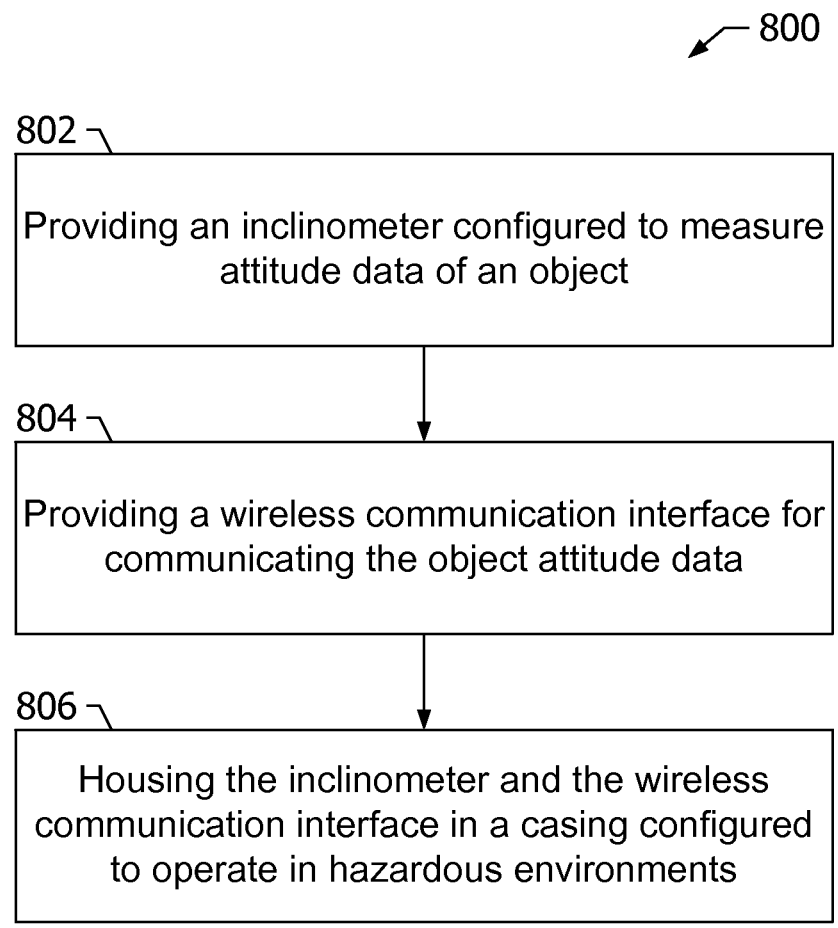
FIG. 8 is a flow chart of a method of manufacturing an inclinometer device.

FIG. 8 is a flow chart of a method 800 of manufacturing an inclinometer device, such as inclinometer device 300 (shown in FIG. 3). Method 800 includes providing 802 an inclinometer configured to measure attitude data of an object. The inclinometer may be any known inclinometer capable of determining a pitch and a roll of an object. An object may include an aircraft, a ship, an automobile, a building, an oil platform, and/or a bridge.

Method 800 also includes providing 804 a wireless communication interface for communicating the object attitude data. The object attitude data may be communicated to at least one of a presentation interface and a remote device.

Method 800 further includes housing 806 the inclinometer and the wireless communication interface in a casing configured to operate in hazardous environments. The casing may also be configured to prevent at least one of entry of a flammable gas and exit of an electrical spark. The casing may be fabricated from at least one of Copper-free Aluminum, lens-covered tempered soda lime glass, and an electrostatically applied gray powder epoxy/polyester.

A technical effect of systems and methods described herein includes at least one of: (a) providing an inclinometer configured to measure attitude data of an object; (b) providing a wireless communication interface for communicating the object attitude data; and (c) housing the inclinometer and the wireless communication interface in a casing configured for use in hazardous environments.

As compared to known methods and systems for determining attitude, the methods and systems described herein enable a worker to efficiently and safely install an attitude measurement device. The methods and systems herein also facilitate measuring aircraft orientation data with an accuracy of 0.01 degrees, exceeding a 0.05 degree accuracy. Moreover, the methods and systems described herein provide a device that is packaged for operation in harsh environments.

Implementations of methods and systems for measuring attitude of manufactured objects using inclinometer devices are described above in detail. The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inclinometer device comprising:
   an inclinometer for measuring attitude data of an object;
   a wireless communication interface for communicating the object attitude data; and
   a casing for housing said inclinometer and said wireless communication device, said casing configured for use in hazardous environments.

2. The device of claim 1, wherein said casing is further configured to prevent at least one of entry of a flammable gas and exit of an electrical spark.

3. The device of claim 1, wherein said casing is fabricated from at least one of Copper-free Aluminum, lens-covered tempered soda lime glass, and an electrostatically applied gray powder epoxy/polyester.

4. The device of claim 1, wherein said inclinometer device has a measurement accuracy of between 0.01 degrees and 0.05 degrees.

5. The device of claim 1, wherein said inclinometer device has a measurement accuracy of between 0.01 degrees and 0.03 degrees.

6. The device of claim 1, wherein said inclinometer device has a range of about 200 feet.

7. The device of claim 1, further comprising a presentation interface configured to display the object attitude data to a user.

8. The device of claim 1, wherein the object includes one of an aircraft, a ship, an automobile, a building, an oil platform, and a bridge.

9. A method of manufacturing an inclinometer device, the method comprising:
   providing an inclinometer configured to measure attitude data of an object;
   providing a wireless communication interface for communicating the object attitude data; and
   housing the inclinometer and the wireless communication interface in a casing configured for use in hazardous environments.

10. The method of claim 9, further comprising housing the inclinometer and the wireless communication interface in a casing configured to prevent at least one of entry of a flammable gas and exit of an electrical spark.

11. The method of claim 9, further comprising fabricating the casing from at least one of Copper-free Aluminum, lens-covered tempered soda lime glass, and an electrostatically applied gray powder epoxy/polyester.

12. The method of claim 9, wherein the inclinometer device has a measurement accuracy of between 0.01 degrees and 0.05 degrees.

13. The method of claim 9, further comprising providing a presentation interface configured to display the object attitude data to a user.

14. An attitude measurement system comprising:
   an inclinometer device comprising:
      an inclinometer for measuring attitude data of an object;
      a wireless communication interface for communicating the object attitude data; and
      a casing for housing said inclinometer and said wireless communication device, said casing configured for use in hazardous environments; and
   an inclinometer measurement computer system communicatively coupled to said inclinometer device, said inclinometer measurement computer system comprising a processor coupled to a memory, said memory including computer-executable instructions that, when executed by said processor, cause said inclinometer measurement computer system to:
      receive the object attitude data from said inclinometer device; and
      display the object attitude data to a user.

15. The system of claim 14, wherein said casing is further configured to prevent at least one of entry of a flammable gas and exit of an electrical spark.

16. The system of claim 14, wherein said casing is fabricated from at least one of Copper-free Aluminum, lens-covered tempered soda lime glass, and an electrostatically applied gray powder epoxy/polyester.

17. The system of claim 14, wherein said inclinometer device has a measurement accuracy of between 0.01 degrees and 0.05 degrees.

18. The system of claim 14, wherein said inclinometer device has a range of about 200 feet.

19. The system of claim 14, further comprising a presentation interface configured to display the object attitude data to a user.

20. The system of claim 14, wherein the object includes one of an aircraft, a ship, an automobile, a building, an oil platform, and a bridge.

21. A method of manufacturing an object using an inclinometer device configured for use in hazardous environments, said method comprising:
    installing the inclinometer device to a mainframe of the object;
    measuring attitude data of the object using an inclinometer housed within the inclinometer device by a casing;
    communicating the attitude data to a user using a wireless communication interface housed within the casing; and
    leveling the object until the inclinometer device indicates that the object is level.

22. The method of claim 21, further comprising determining where a support structure of the object couples to the mainframe of the object.

23. The method of claim 21, further comprising displaying the attitude data to the user via a presentation interface.

24. The method of claim 21, further comprising removing the inclinometer device from the object when the inclinometer device indicates that the object is level.

* * * * *